United States Patent
Lindgren et al.

(10) Patent No.: US 8,675,763 B2
(45) Date of Patent: Mar. 18, 2014

(54) MULTI-STREAM COMMUNICATION SYSTEM

(75) Inventors: Ulf Lindgren, Göteborg (SE); Bo Hagerman, Tyresö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 253 days.

(21) Appl. No.: 13/123,673

(22) PCT Filed: Oct. 9, 2008

(86) PCT No.: PCT/EP2008/008511
§ 371 (c)(1),
(2), (4) Date: Apr. 11, 2011

(87) PCT Pub. No.: WO2010/040369
PCT Pub. Date: Apr. 15, 2010

(65) Prior Publication Data
US 2011/0274191 A1  Nov. 10, 2011

(51) Int. Cl.
*H04B 7/02* (2006.01)
(52) U.S. Cl.
USPC .......................................................... 375/267
(58) Field of Classification Search
USPC ........................................ 375/257, 267, 299
See application file for complete search history.

(56) References Cited

U.S. PATENT DOCUMENTS

| 6,317,411 | B1 * | 11/2001 | Whinnett et al. | 370/204 |
| 6,931,238 | B1 * | 8/2005 | Aizawa et al. | 455/101 |
| 7,558,335 | B2 * | 7/2009 | Li | 375/299 |
| 7,643,574 | B2 * | 1/2010 | Roh et al. | 375/299 |
| 7,680,175 | B2 * | 3/2010 | Jung et al. | 375/146 |
| 2003/0052813 | A1 * | 3/2003 | Natsume | 342/70 |
| 2003/0185309 | A1 * | 10/2003 | Pautler et al. | 375/257 |
| 2005/0233717 | A1 * | 10/2005 | Iwakuni | 455/133 |

FOREIGN PATENT DOCUMENTS

| EP | 1906556 A | 4/2008 |
| WO | WO 00/51265 A | 8/2000 |

* cited by examiner

*Primary Examiner* — Jaison Joseph

(57) ABSTRACT

The present invention relates to a multi-stream communication system comprising a transmitting node provided with a polyphase antenna and a receiving node provided with an antenna arrangement configured to receive multiple data streams. The polyphase antenna has at least one group of multiple antenna elements, each group having N antenna elements. The transmitting node is also provided with at least one radio chain and a switch for each radio chain arranged to cyclically connect each radio chain to the antenna elements in one of the groups. The switch is configured to operate with a switching frequency $f_{sw}$. The transmitting node is further configured to transmit M weighted symbols of an uncorrelated signal from each antenna element in each group, the M weighted symbols being less than or equal to N, and the receiving node is further configured to convert the received N data streams into each respective uncorrelated signal.

17 Claims, 4 Drawing Sheets

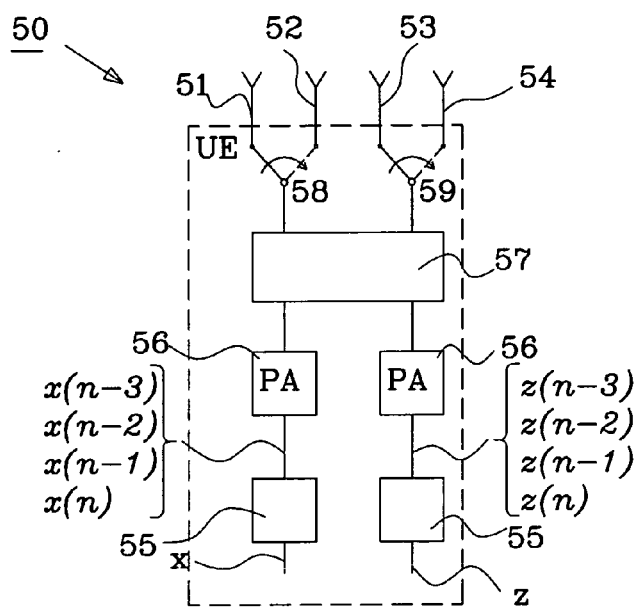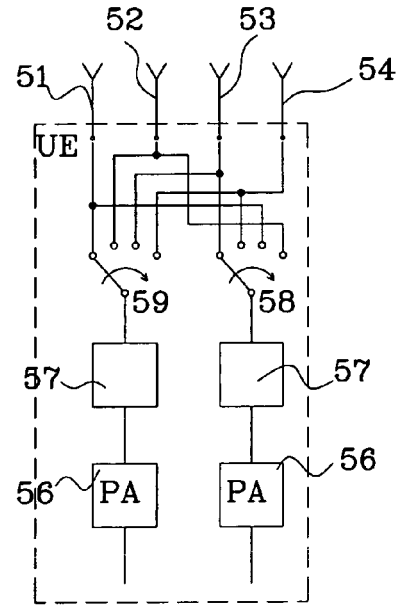
Fig. 5a    Fig. 5b
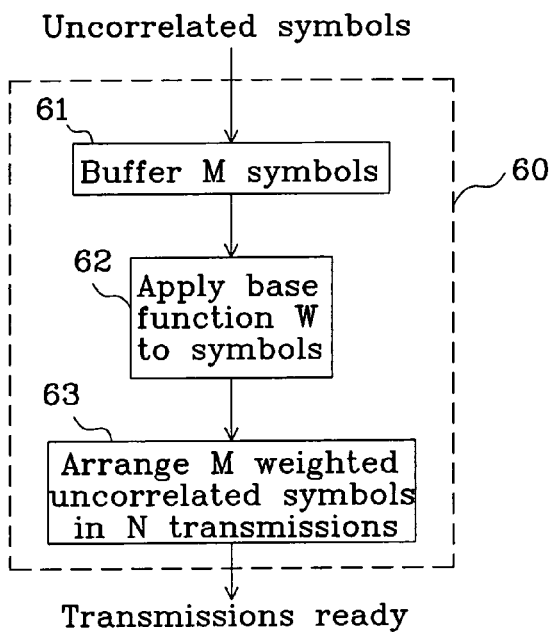
Fig. 6

US 8,675,763 B2

MULTI-STREAM COMMUNICATION SYSTEM

TECHNICAL FIELD

The present invention relates to a system and a method for providing multi-stream communication, especially between two nodes in a wireless communication system where at least one node uses a polyphase antenna.

BACKGROUND

An antenna array is a collection of antenna elements. Typically, the antenna elements are placed equidistant along a line. This type of antenna array is also known as a Uniform Linear Array (ULA). A common mathematical description of an ULA is:

$$H(\lambda, d, \theta, \phi) = g(\lambda, \theta, \phi) \sum_{k=0}^{K} w_k e^{\frac{2j\pi dk}{\lambda} \cos(\theta)}, \quad (1)$$

where the function $g(\lambda,\theta,\phi)$ is an antenna element factor, d is the distance between the antenna elements, k is the element number and $\lambda$ is the used wave length. The sum is often called the array factor. The antenna response of the antenna array is the array factor weighted by the element response and is typically evaluated in a plane, e.g. by sweeping the $\theta$ angle. The antenna gain response in this plane can be altered via weights $w_k$, and a main beam can be placed in a desired direction. However, the distance between antenna elements plays an important role. The antenna response is a periodic function in e.g. $\theta$, and the period is determined by the element distance d and the wavelength $\lambda$. An element spacing of $\lambda/2$ maps one period on the $\theta$ interval $[0,\pi]$.

To avoid coupling between adjacently arranged antenna elements, the distance between elements can be increased. The drawback with an increased distance between the elements is that several periods of the gain function are mapped onto the $\theta$ interval $[0,\pi]$. This makes the antenna ambiguous in direction finding since replicas of the main beam are in the visible interval. A remedy can be to use polyphase antenna as described in the published international patent application WO 2008/066436 [reference 1], which is assigned to the present applicant and briefly described in connection with FIG. 2.

The drawback of using the polyphase antenna is cost of time, i.e. a symbol needs to be applied to the antenna ports for a complete switching cycle of the switch. This implies that the communication ratio is reduced compared to a traditional antenna configuration, in which every antenna element is fed by a signal via a dedicated radio chain as discussed in connection with FIG. 1.

SUMMARY OF THE INVENTION

An object with the present invention is to provide a multi-stream communication system that overcomes the drawback of the reduced communication rate when using a polyphase antenna.

This object is achieved by a multi-stream communication system comprising two nodes, wherein a first node is provided with a polyphase antenna arrangement. The polyphase arrangement comprises at least one group of multiple antenna elements, each group having the same number of antenna elements, e.g. N antenna elements. A radio chain, including necessary parts, such as a power amplifier (PA) and block processing capabilities, is connected to one of the at least one group of antenna elements via a switch. The switch is configured to cyclically connect the radio chain to the antenna elements in the respective group of antenna elements.

An advantage with the present invention is that a communication rate in a multi-stream communication system is maintained although the number of radio chains in the first node is reduced.

Further objects and advantages may be found by a skilled person in the art from the detailed description.

BRIEF DESCRIPTION OF DRAWINGS

The invention will be described in connection with the following drawings that are provided as non-limited examples, in which:

FIG. 5a shows a second embodiment of mobile user equipment according to the invention.

FIG. 5b shows an equivalent construction of mobile user equipment according to one variant of the second embodiment shown in FIG. 5a.

FIG. 6 shows a flow chart for creating transmissions from uncorrelated symbols in a message before being transmitted according to the invention.

DETAILED DESCRIPTION

The basic concept of the invention is to create a system in which the time used to communicate a number of symbols appears to be the time to communicate one symbol. In the reminder of the application it will be assumed that the first node is a User Equipment (UE) is provided with a polyphase antenna having one or more antenna element groups. The second node is assumed to be a Base Station (BS) being provided with capabilities to receive multiple data streams, such as Multiple Input Multiple Output (MIMO) capabilities. In addition, it is assumed that the communication channel is rich, e.g. supports many streams.

The antenna operates by periodically time varying weights, i.e. one set of weights for each required polyphase function. At the receiver the ambiguous polyphase functions are combined into an unambiguous response.

Figure 1:
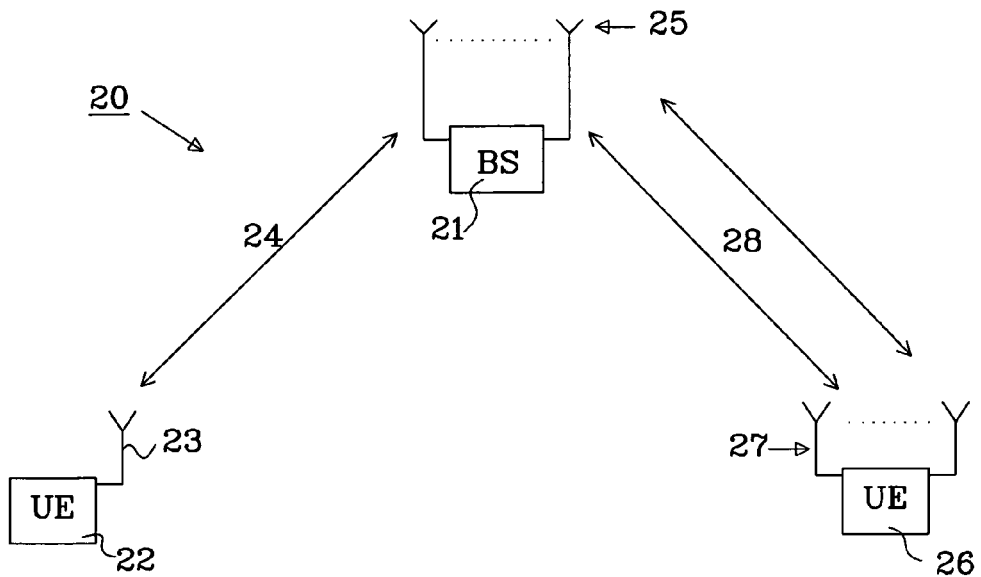
FIG. 1 shows a prior communication system with single stream and multiple stream communications.

FIG. 1 shows a prior art communication system 20 comprising a base station (BS) 21 configured to communicate with user equipment (UE) 22 and 26. The first UE 22 is provided with a single antenna element 23 and communicates with the BS over a single data stream 24. The first UE 22 further comprises a radio chain (not shown) connected to the single antenna element 23 through which radio chain a signal is amplified and processed into symbols before the symbols are transmitted over the single data stream 24. The BS 21 is provided with an antenna arrangement 25, having multiple antenna elements, being configured to receive multiple data streams. The receiving capacity of BS 21 is limited to the maximum capacity of a Single Input Multiple Output (SIMO)

channel. Thus, the maximum receiving capability of the BS 21 is not available for the first UE 22, and thus the communication speed between the BS and the first UE is limited.

The second UE 26 is provided with an antenna arrangement 27 comprising multiple antenna elements, e.g. N antenna elements, which preferably matches the number of data streams the BS 21 may receive. In this example each antenna element in the antenna arrangement 27 is provided with a separate radio chain (not shown), i.e. power amplifier and block processing capabilities. A signal intended to be transferred from the UE 26 to the BS 21 is divided into N signals, and each signal is amplified and processed into symbols in each radio chain before the symbols are transmitted from the antenna elements over N data streams 28.

The maximum receiving capability of the BS 21 is used, but the hardware needed to provide communication over N data streams between the BS and the second UE 26 results in an expensive UE having a rather high energy consumption compared to the first UE 22.

Figure 2:
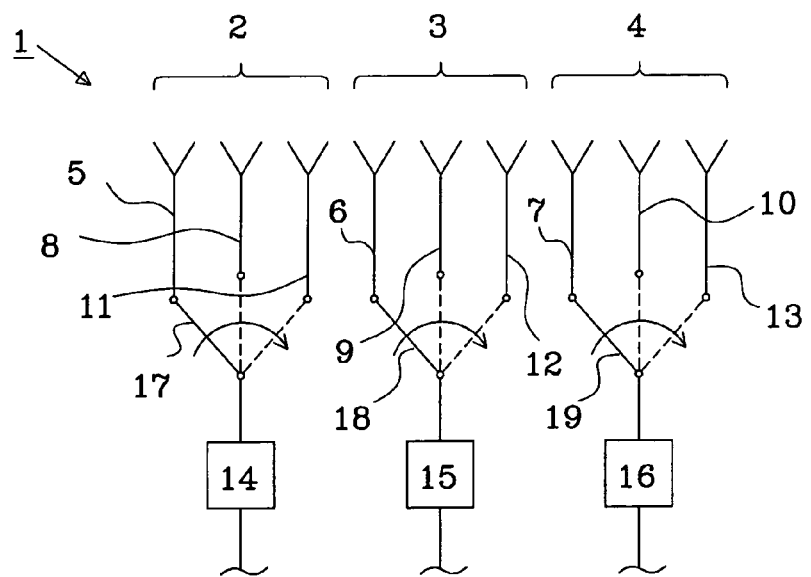
FIG. 2 shows a prior art polyphase antenna.

A polyphase antenna arrangement 1, as illustrated in FIG. 2, could be implemented in an UE to increase the communication speed, compared to the first UE 22 described above, without having the disadvantage of providing a radio chain to each antenna element, as is the case for the second UE 26 described above.

The antenna arrangement 1 is an array antenna comprising at least one group of antenna elements having the same number of antenna elements in each group. In this embodiment the array antenna 1 comprises a first group of antenna elements 2, a second group of antenna elements 3 and a third group of antenna elements 4. Each group 2, 3, 4 comprises a first antenna element 5, 6, 7; a second antenna element 8, 9, 10; and a third antenna element 11, 12, 13, respectively. Totally, the array antenna 1 comprises nine antenna elements 5-13, where the antenna elements are arranged essentially equidistantly along a line. The distance between adjacent antenna elements is $\lambda/2$, where $\lambda$ is the wavelength that corresponds to the frequency used. In this case, no grating lobes would appear if all antenna elements 5-13 were engaged at the same time, e.g. coupled to a transmitter.

A first radio chain 14 is connected to the first group of antenna elements 2, a second radio chain 15 is connected to the second group of antenna elements 3 and a third radio chain 16 is connected to the second group of antenna elements 4. Each radio chain 14-16 comprises radio elements arranged for transmission, reception or both. The construction of radio chains is previously known and obvious for a skilled person in the art, and will thus not be described in more detail.

Each radio chain 14-16 is connected to the respective group of antenna elements 2-4 by means of a respective first switch 17, second switch 18 and third switch 19. Each switch 17-19 is arranged to switch the corresponding radio chain 14-16 between the three antenna elements 5, 8, 11; 6, 9, 12; 7, 10, 13 in the corresponding group of antenna elements 2-4.

All switches 17-19 switch in the same manner such that the first antenna element 5, 6, 7 in each respective group of antenna elements 2, 3, 4 is connected to its respective radio chain 14, 15, 16 at essentially the same time, the second antenna element 8, 9, 10 in each group of antenna elements 2, 3, 4 is connected to its respective radio chain 14, 15, 16 at essentially the same time and the third antenna element 11, 12, 13 in each respective group of antenna elements 2, 3, 4 is connected to its respective radio chain 14, 15, 16 at essentially the same time. Those antenna elements that are not coupled to a respective radio chain 17, 18, 19 at a certain time are preferably connected to a matched load (not shown).

The drawback with the antenna arrangement described in FIG. 2, has been mentioned in the background, i.e. loss of time. A symbol of the signal applied to each radio chain needs to be present during the complete switching cycle, i.e. during which each respective radio chain connects to all antenna elements in each group of antenna elements.

The present invention is based on the use of a polyphase antenna in a node, such as a UE, and is illustrated with the following examples. For instance, it is described how to extend the concept in the context of Single Input Multiple Output (SIMO) channels.

The User Equipment (UE) is communicating with a base station (BS) and it is assumed that the BS is aware of the principle of communication. At the UE side, a message (or signal) x is to be transmitted. The message is coded into communication symbols, e.g. Quadrature Amplitude Modulation (QAM). The message is obviously a sequence of symbols. These symbols are assumed to be a process of Independent and Identically Distributed (IID) Random Variables (RVs), e.g. uncorrelated symbols in the Gaussian case. In practice this assumption is, typically, not valid. However, by shuffling the correlated symbols according to a deterministic sequence it is possible to approximate a random behaviour, i.e. transform the correlated symbols into uncorrelated symbols, e.g. using an interleaver or random number generator.

Furthermore, it is assumed that the BS side has capabilities of receiving multiple data streams, e.g. the BS has MIMO support.

General Example of the Inventive Concept

In a general example of the present invention it is assumed that the BS has four receivers each connected to an antenna arrangement adapted to receive at least four data streams, e.g. having MIMO capabilities. A UE is provided with a single power amplifier (PA), but equipped with a switch and four antenna ports. Furthermore, the UE is also equipped with block processing capabilities in order to process symbols in a message into a suitable format for transmission as described below.

The switch will create a virtual ULA using a polyphase schema with a switching cycle of four. This implies, according to reference [1], that a symbol is applied four times, one time for each port. Differently stated the symbol is transmitted four times. However, assuming that the ports are located equidistant and that the channel is constant over the cycle one creates an array. By weighting each of the applied symbols differently a beamformer is achieved, and the time spent to send a symbol is four. However, assume that the channel is rich, i.e. supports multiple data streams, then propagation is viable in any direction and also at the same power cost. Hence, four symbols are retrieved from the message sequence and transmitted over the virtual array. All four symbols are applied to each antenna port using a unique base function as weight. This implies that all four symbols can be transmitted during one complete switching cycle. Thus, the rate has increased by a factor of four, which is the theoretical MIMO gain in this example.

At the receivers in the BS, the aggregated signal is considered to be a MIMO transmission. The received sequences of symbols are in fact one sequence and therefore, from the BS point of view there is a loss which is the polyphase cycle time. Here it is stressed that from the UE side the transmission rate is increased compared to the transmission rate for the antenna arrangement described in reference [1]. An illustrative example describes the inventive procedure.

The random sequence x, comprising uncorrelated symbols:

$$x(n-3); x(n-2); x(n-1); x(n); x(n+1); x(n+2); x(n+3);$$

is transmitted using the base function W. The base function is a unitary four by four matrix where the columns are used as weights for beam forming.

$$W = \begin{pmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{pmatrix}$$

The transmission at time n; n+1; n+2; n+3 is:

$$y_0(n) = x(n-3)w_{11}(n) + x(n-2)w_{12}(n) + x(n-1)w_{13}(n) + x(n)w_{14}(n) \qquad (2)$$

$$y_1(n+1) = x(n-3)w_{21}(n) + x(n-2)w_{22}(n) + x(n-1)w_{23}(n) + x(n)w_{24}(n) \qquad (3)$$

$$y_2(n+2) = x(n-3)w_{31}(n) + x(n-2)w_{32}(n) + x(n-1)w_{33}(n) + x(n)w_{34}(n) \qquad (4)$$

$$y_3(n+3) = x(n-3)w_{41}(n) + x(n-2)w_{42}(n) + x(n-1)w_{43}(n) + x(n)w_{44}(n) \qquad (5)$$

The first weighted symbols in equation (2) are transmitted via the first antenna port, i.e. switch position "0" at time n, the second weighted symbols in equation (3) are transmitted via the second antenna port, i.e. switch position "1" at time n+1, and so on. The message of four symbols is thus transmitted as one symbol per PA usage.

In the example illustrated above the transmitter using a polyphase approach can make use of a receiver which has MIMO reception capabilities.

Furthermore, the UE in the general example above has one PA, however, the invention is not limited to such UEs. Moreover, the invention is not limited to the case where the channel is rich, i.e. having a large angular spread meaning that radio wave propagation occurs in several directions at the same time.

The operation described in the general example can be formalized as a matrix operating on a vector, i.e.

$$y = \begin{bmatrix} y_0(n) \\ \vdots \\ y_K(n+(K-1)) \end{bmatrix} = \begin{bmatrix} w_{11} & \cdots & w_{1K} \\ \vdots & \ddots & \vdots \\ w_{K1} & \cdots & w_{KK} \end{bmatrix} \begin{bmatrix} x(n-K+1) \\ \vdots \\ x(n) \end{bmatrix} = Wx \qquad (6)$$

where K is the number of antenna elements and the number of PAs is one. The input vector is collected during a period of time which equals the number of antennas times the symbol time. The collection can be made using, for example, a double circular buffer.

Figure 3:
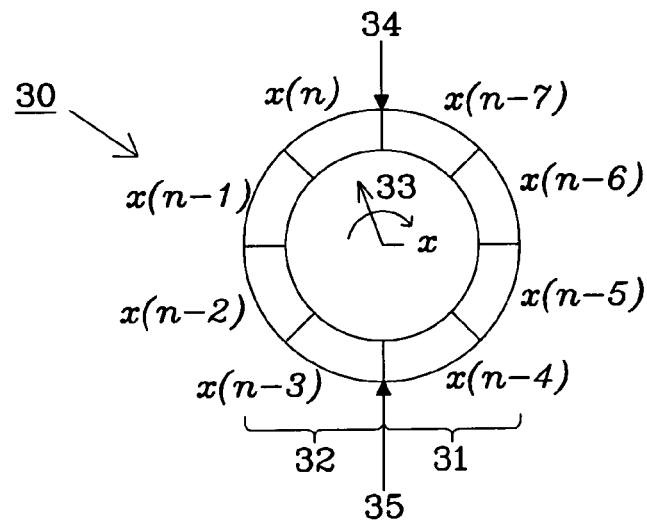
FIG. 3 shows an example of a buffer for use in the invention.

A double circular buffer 30 is illustrated in FIG. 3. The input is stored in the buffer where the start and stop are neighbours, i.e. the addressing is in moduli operation (here in moduli eight). The right part 31 is available for use until the input feed 33 pass the mid point 34 at the top. A signal "left buffer ready" is raised at 34 indicating that the right part 31 is current input buffer half and the left part 32 is ready for use until the input feed 33 passes the mid point 35 at the bottom and a signal "right buffer ready" is raised at 35 indicating that the left part 32 is now current input buffer half and the right part 31 is once again ready for use.

Consequently, as one of the half is filled with data (i.e. input buffer half), the other half is used in transmission (i.e. use buffer half). Moreover for every new input in the input buffer half, a weighted combination from the use buffer half is transmitted. The transmitted combinations are as those indicated in equations 2-5.

From equations 2-5 it should be stressed that rather than keeping a sample buffer, as the buffer described in connection with FIG. 3, it is possible to iteratively compute a transmission buffer, which is obvious for a person skilled in the art.

Figure 4:
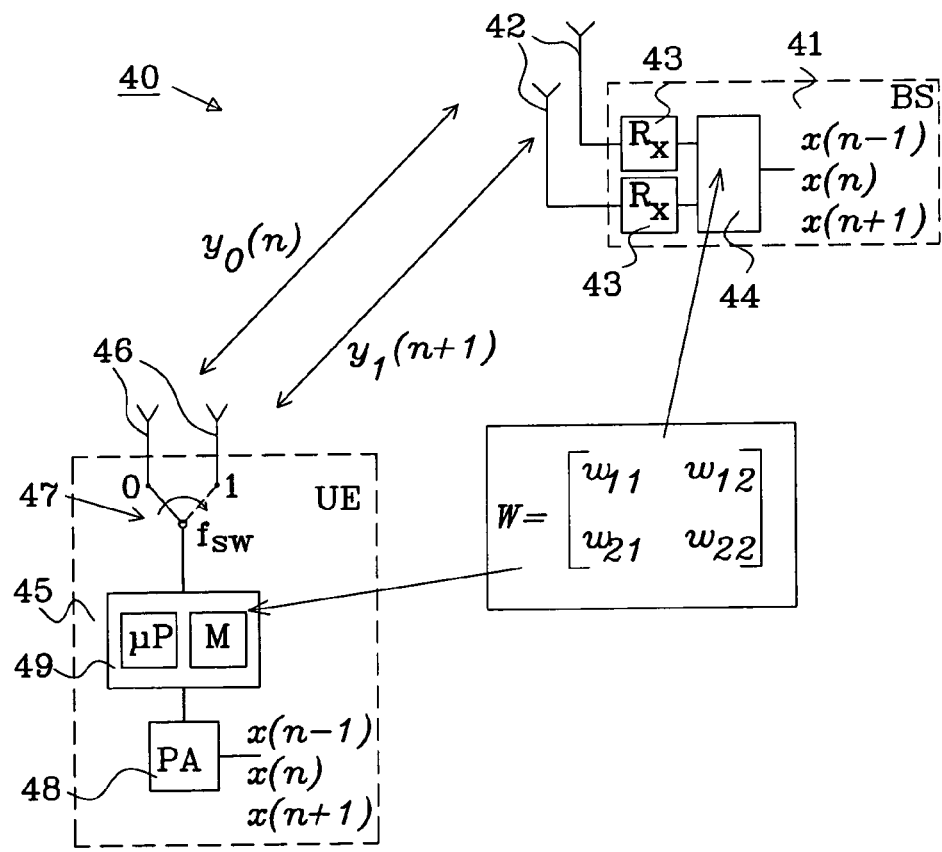
FIG. 4 shows a first embodiment of a communication system including a first embodiment of mobile user equipment provided with a polyphase dual antenna and a base station configured to receive two independent data streams.

FIG. 4 shows a first embodiment of a communication system 40 according to the present invention. A BS 41 has in this embodiment two receiving antennas 42 each connected to two receivers 43. The receivers are connected to a converter 44 configured to convert the symbols of the received data stream into a message based on the knowledge of the base function W used to create the weighted symbols transmitted from a UE 45.

The UE 45 has in this embodiment a polyphase antenna having one group of two antenna elements 46, a radio chain connected to a switch 47 having two antenna ports labelled "0" and "1" to which each respective antenna element 46 is connected. The switch 47 is arranged to cyclically connect the radio chain to the antenna ports, and thereby to the antenna elements in the group at a switching frequency $f_{sw}$. The radio chain comprises a PA 48 and a block processing unit 49. The PA 48 is fed by a message comprising uncorrelated symbols $x(n-1); x(n); x(n+1); (x+2); \ldots$, each uncorrelated symbol is amplified in the PA 48 and thereafter fed to the block processing unit 49.

In the block processing unit 49, the uncorrelated symbols are arranged into a number of weighted uncorrelated symbols to be transmitted from the antenna elements during a switching cycle of the switch 47. This may be implemented using a memory M to store incoming uncorrelated symbols of the message, such as the buffer described in connection with FIG. 3, and a processing unit µP to calculate the weighted uncorrelated symbols using the base function:

$$W = \begin{bmatrix} w_{11} & w_{12} \\ w_{21} & w_{22} \end{bmatrix}$$

and the relationship in equation 6:

$$y = \begin{bmatrix} y_0(n) \\ y_1(n+1) \end{bmatrix} = \begin{bmatrix} w_{11} & w_{12} \\ w_{21} & w_{22} \end{bmatrix} \begin{bmatrix} x(n-1) \\ x(n) \end{bmatrix} = Wx \qquad (7)$$

This results in the following transmission at time n:

$$y_0(n) = w_{11}x(n-1) + w_{12}x(n)$$

which is calculated and transmitted through antenna port "0" at the same time (i.e. during the same sample interval) as the symbol x(n) is stored in the memory. Another calculation is performed and the transmission at time n+1 is:

$$y_1(n+1) = w_{21}x(n-1) + w_{22}x(n)$$

which is transmitted through antenna port "1" at the same time (i.e. during the next sample interval) as the next symbol in the message x(n+1) is stored in the memory.

Two data streams are transmitted over the communication channel from the polyphase antenna of the UE 45 and received at the BS 41, as illustrated by the two arrows in FIG. 4.

Note that the switching frequency $f_{sw}$ of the switch is in this example synchronized with the sample frequency $f_s$ of the message. However, a switching frequency that exceeds the sampling frequency of the message will not increase the communication rate over the communication channel, since the rate is determined by the input rate of symbols into the memory.

Further generalization can be made by assuming that the transmitter has N amplifiers, and would like to communicate with a receiver that has M amplifiers. The approach can be generalized to cover MIMO transmissions given an integer K, wherein M=KN. In such case the number of antenna elements is KN. The streams transmitted over these antenna elements are formed by base functions $W_1 \ldots W_N$.

The simple case of user equipment UE 50 of K=2 and N=2 is illustrated in FIG. 5a. The transmission array is four elements 51-54, but only two are operated at a time. In this example each input signal x and z is a correlated signal, i.e. comprised of correlated symbols, and a transformer 55 is provided in which the correlated signal is transformed into an uncorrelated signal before it is fed into a power amplifier PA 56. A block processing unit 57, which may be common for processing both input signals x and z, thereafter receives the symbols and arranges them into transmissions using base functions. The base function is responsible for mapping the appropriate input signal x, z to the correct antenna element 51-54 at each time instance via the switches 58 and 59, which are two-port switches.

A first possible mapping is to use two antennas per stream, i.e. the uncorrelated symbols x(n−1); x(n); x(n+1); . . . of the first stream "x" are arranged into two weighted symbols to be transmitted from antenna elements 51 and 52 at time n and n+1, respectively, using a first base function $W_1$ in the relationship described in connection with equation 7. The same applies to the second stream "z", which is transformed into uncorrelated symbols z(n−1); z(n); z(n+1); . . . and arranged into two weighted symbols to be transmitted from antenna elements 53 and 54 at time n and n+1, respectively, using a second base function $W_2$ in the relationship described in connection with equation 7.

However, a second possible mapping having a more flexible approach is to use all antenna elements 51-54 for each stream using the following relationship, provided x and z are uncorrelated:

$$y = \begin{bmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{bmatrix} \begin{bmatrix} x(n-3) & z(n-3) \\ x(n-2) & z(n-2) \\ x(n-1) & z(n-1) \\ x(n) & z(n) \end{bmatrix}, \quad (8)$$

which results in the following transmissions being transmitted at time n on antenna elements 51 and 53, respectively:

$$y_{51}(n)=w_{11}x(n-3)+w_{12}x(n-2)+w_{13}x(n-1)+w_{14}x(n)$$

$$y_{53}(n)=w_{11}z(n-3)+w_{12}z(n-2)+w_{13}z(n-1)+w_{14}z(n)$$

The following transmissions are transmitted at time n+1 on antenna elements 52 and 54, respectively:

$$y_{52}(n+1)=w_{21}x(n-3)+w_{22}x(n-2)+w_{23}x(n-1)+w_{24}x(n)$$

$$y_{54}(n+1)=w_{21}z(n-3)+w_{22}z(n-2)+w_{23}z(n-1)+w_{24}z(n)$$

The following transmissions are transmitted at time n+2 on antenna elements 51 and 53, respectively:

$$y_{51}(n+2)=w_{31}x(n-3)+w_{32}x(n-2)+w_{33}x(n-1)+w_{34}x(n)$$

$$y_{53}(n+2)=w_{31}z(n-3)+w_{32}z(n-2)+w_{33}z(n-1)+w_{34}z(n)$$

And the last transmissions are transmitted at time n+3 on antenna elements 52 and 54, respectively:

$$y_{52}(n+3)=w_{41}x(n-3)+w_{42}x(n-2)+w_{43}x(n-1)+w_{44}x(n)$$

$$y_{54}(n+3)=w_{41}z(n-3)+w_{42}z(n-2)+w_{43}z(n-1)+w_{44}z(n)$$

The approach described above is to apply the same base function to both streams, and also to use the same antenna elements for both streams with the exception that they are arranged in a different order. FIG. 5b illustrates this when identical block processing units 57 are connected to the PA for each stream and a modified four-port switch 58a and 59a each connected to all antenna elements.

The latency of the transmission is as high as the configuration described in connection with FIG. 4. However, using two antennas per stream, as discussed above, instead reduces the latency at the expense of spatial resolution.

It should be mentioned that the receiver at the BS (not shown) needs to be provided with means to retransform the received uncorrelated signals to correlated signals if a transformation is performed in the transmitter (UE) as illustrated in FIG. 5a.

FIG. 6 illustrates the steps to create transmissions 60, such as indicated in equation 2-5, from uncorrelated symbols. In step 61 a memory, such as a buffer illustrated in connection with FIG. 3, buffers M symbols to be used when creating the transmissions. M is less than or equal to N representing the number of antenna elements available in each group, and preferably M is equal to N.

When M uncorrelated symbols are available in the buffer the flow continues to step 62 in which a base function W is applied to the M symbols in order to create N number of M weighted uncorrelated symbols by a matrix operating on a vector, as illustrated in equation 6. Each respective transmission, having M weighted uncorrelated symbols, is arranged in a memory in step 63 and is ready to be transmitted from a respective antenna element when the switch cycles through the N antenna elements as new uncorrelated symbols are buffered in step 61.

It should be noted that steps 61-63 and the subsequent transmission step 73 (see FIG. 7) are performed during the same sample interval "n", which is possible since the sample frequency G of the message is much lower than the clock frequency of the memory M and processing unit μP in the block processing unit 49 (see FIG. 4). Steps 62, 63 and 73 may therefore be sequentially performed during the same sample interval as, for instance, symbol x(n) is stored in the memory M, as illustrated in connection with equation 7.

Figure 7:
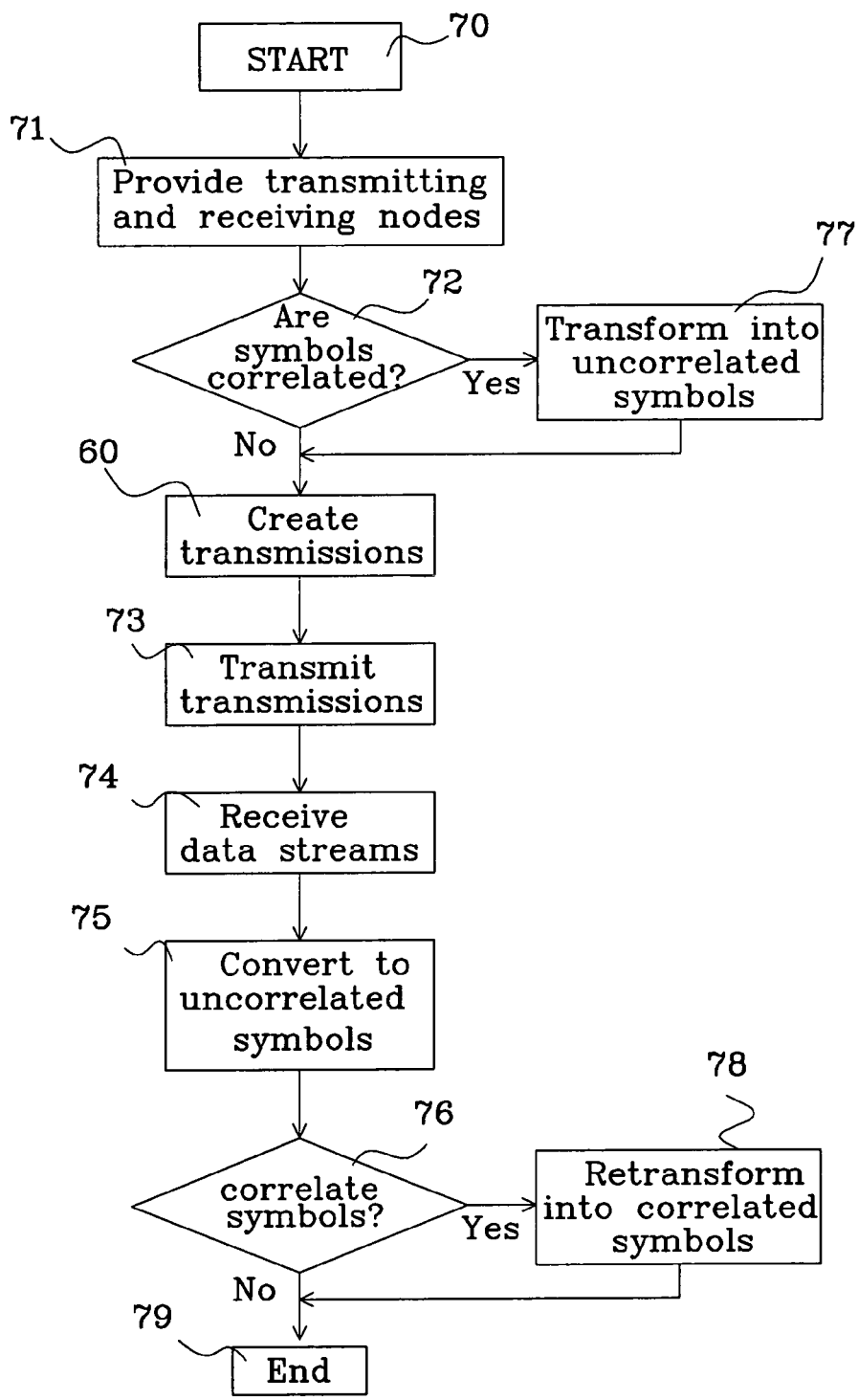
FIG. 7 shows a flow chart for providing multi-stream communication according to the invention.

FIG. 7 shows the procedure for providing multi-stream communication between a first node and a second node in a wireless communication system. The flow starts at 70 and in step 71, the transmitting node and receiving node in the system are provided. The antenna arrangement used by the transmitting node, e.g. user equipment, has at least one group of multiple antenna elements, each group having N antenna elements. At least one radio chain is also provided together with a switch for each radio chain, which cyclically connects each radio chain to one of the at least one group of multiple antenna elements. The switch operates with a switching frequency $f_{sw}$. The receiving node is provided with an antenna arrangement configured to receive N data streams.

The flow continues to step 72 and if a message that is to be transmitted from the transmitting node contains uncorrelated symbols, the flow continues directly to step 60. In the case when the symbols are correlated, they need to be transformed into uncorrelated symbols, step 77, before the flow continues to step 60. The transformation of the correlated symbols into uncorrelated symbols may be achieved by filtering, interleaving, etc. Furthermore, knowledge of the transformation is also provided to the receiving node in order to be able to reconstruct the original message by retransforming the received uncorrelated symbols as explained below in steps 76 and 78.

A detailed explanation of how the transmissions are created in step 60 from uncorrelated symbols is described in connection with FIG. 6. M weighted uncorrelated symbols are thereafter transmitted from each respective antenna element in step 73 using multiple data streams. The receiving node receives N data streams and stores each received transmission in a memory in step 74 and converts them into uncorrelated symbols in step 75 based on information of symbol weighting, i.e. the base function W used when creating the transmissions. The knowledge of the base function is provided to the receiving node before the N data streams are converted either by a code book comprising possible variants of symbol weighting or by receiving information of symbol weighting from the transmitting node in a closed loop. The flow continues to step 76 and if the original message contained uncorrelated symbols, the flow ends in step 79. However, if the original message contained correlated symbols, the flow continues to step 78 in order to retransform the received uncorrelated symbols to correlated symbols before the flow ends in step 79.

The same procedure is applicable for each message transmitted from the transmitting node, since each message is processed in a separate radio chain. Normally each radio chain is connected to a dedicated number of antenna elements via a switch, such as described in the first possible mapping in connection with FIG. 5a and equation 7. However, it is possible to connect two radio chains to the same group of antenna elements as long as the respective switch ports connect to different antenna elements, as described in connection with the second possible mapping in connection with FIG. 5a and FIG. 5b.

Further generalizations can be made, for example a transmitter having two PAs can send three streams by first using two PAs followed by the usage of one PA. Naturally, this transmission can be accomplished by using the two Pas two times. The polyphase approach will reduce the communication efficiency by the factor K. However, a transmitting device which has two PAs is actually used with an antenna (virtual) that has four ports. In principle this means that a rich channel can support four streams and thus one can chose to consider two streams as four, given some appropriate temporal property like independence. The implication is that the two streams can be transmitted using higher resolution without sacrificing speed, i.e. four streams are transmitted but can by construction at the receiver side be converted to two streams. The principal explanation is actually illustrated in the general example above.

By using linearity, each stream at the transmitter can be considered subject to one PA. A stream $x_k(n)$ is switched over M ports. However, since $E[x_k(n)x_l(m)]=\delta((k-l)+(n-m))$ the streams can be multiplexed. Here the indices, k and l, are related to the spatial dimension and the two arguments, n and m, are related to the temporal dimension. As previously stated it is assumed that the processes are IID which means that the above identity hold true. The reason is that the signal/process, which is multiplexed in temporal as well as spatial dimension, reaching the polyphase antenna is uncorrelated.

In general the base function, W, may be any full rank matrix, i.e. not necessary unitary, provided that W is known at the receiver. In case the base function is unknown or partly unknown, it must be estimated, which calls for properties such as IID. Furthermore, having a unitary matrix, W, as basis makes it possible to relax the IID assumption. This is so because the temporal multiplexing is made orthogonal by the weighting.

Nevertheless, assuming that the receiver is informed of the transmission direction (eigen direction) of the transmitter, then it is possible to deterministically chose multiplexing direction such that a system of equations can be solved to extract the information. Basically what is received is $$y(n)=HWx \tag{9}$$

where H is the channel, W and x is one of the transmitted time multiplexed streams. Now, the channel is typically estimated and can be removed. Since the eigen direction is known, W may be constructed and it can be removed by its inverse. What is left is the transmitted time multiplexed signal which can be de-multiplexed since the multiplexing scheme is known.

Finally, in case the eigen direction is poor or the channel estimate is poor equation 9 may be solved for x. This is achieved by using a blind search aiming to minimize the element correlation of the vector y. I.e. for example:

$$V(T)=\min \arg(E[y^H T^H T y])^2 \tag{10}$$

which is basically a source separation problem.

| Abbreviations | |
| --- | --- |
| 3GPP | 3$^{rd}$ Generation Partnership Project |
| BS | Base Station |
| IID | Independent and Identically Distributed |
| MIMO | Multiple Input Multiple Output |
| PA | Power Amplifier |
| QAM | Quadrature Amplitude Modulation |
| RV | Random Variable |
| UE | User Equipment |
| ULA | Uniform Linear Array |

REFERENCES

[1] WO 2008/066436 by U. Lindgren et al. "A microwave sparse array antenna arrangement" assigned to Telefonaktiebolaget LM Ericsson (publ).

The invention claimed is:

1. A multi-stream communication system, comprising:
a first node provided with an antenna arrangement having at least one group of multiple antenna elements, each group having N antenna elements; at least one radio chain; and a switch for each radio chain arranged to cyclically connect each radio chain to said antenna elements in one of said at least one group, said switch configured to operate with a switching frequency $f_{sw}$;
a second node provided with an antenna arrangement configured to receive N data streams; wherein,
said first node is configured to transmit M weighted symbols formed by a weighted summation of uncorrelated symbols of an uncorrelated signal from each antenna element in each group, said uncorrelated signal comprising said uncorrelated symbols having a sampling frequency $f_s$ and said switching frequency $f_{sw}$ is synchronized with, or exceeds, said sampling frequency $f_s$, said M weighted symbols being less than or equal to N and said weighted summation including a matrix of full rank; and
said second node is configured to convert said N data streams into each respective uncorrelated signal.

2. The multi-stream communication system according to claim 1, wherein said first node comprises a transformer configured to transform a correlated signal into said uncorrelated signal before transmission from each antenna element in each group, and said second node is configured to retransform each respective uncorrelated signal into said correlated signal.

3. The multi-stream communication system according to claim 2, wherein said transformer is configured to use interleaving or filtering to transform each correlated signal into said uncorrelated signal.

4. The multi-stream communication system according to claim 1, wherein said first node comprises a block processing unit having a memory configured to store said uncorrelated symbols, and a processing unit configured to arrange said uncorrelated symbols into said M weighted symbols to be transmitted from said N antenna elements.

5. The multi-stream communication system according to claim 4, wherein said memory is a double circular buffer.

6. The multi-stream communication system according to claim 1, wherein said first node comprises only one radio chain including one power amplifier.

7. The multi-stream communication system according to claim 1, wherein said second node is provided with information of symbol weighting before said N data streams are converted.

8. The multi-stream communication system according to claim 7, wherein said second node comprises a code book comprising possible variants of symbol weighting.

9. The multi-stream communication system according to claim 7, wherein said second node is configured to receive said information of symbol weighting from said first node in a closed loop.

10. The multi-stream communication system according to claim 1, wherein said antenna arrangement of said first node has only one radio chain for each group of multiple antenna elements.

11. The multi-stream communication system according to claim 1, wherein said first node is user equipment and said second node is a base station in said multi-stream communication system.

12. A method to provide multi-stream communication between a first node and a second node in a wireless communication system, wherein said first node is provided with an antenna arrangement having at least one group of multiple antenna elements, each group having N antenna elements; at least one radio chain; and a switch for each radio chain to cyclically connect each radio chain to one of said at least one group, said switch operating with a switching frequency $f_{sw}$; and said second node is provided with an antenna arrangement configured to receive N data streams, said method comprising the steps of:

transmitting M weighted symbols formed by a weighted summation of uncorrelated symbols of an uncorrelated signal from each antenna element in each group of said first node, said uncorrelated signal comprising said uncorrelated symbols having a sampling frequency $f_s$ and said switching frequency $f_{sw}$ is synchronized with, or exceeds, said sampling frequency $f_s$, said M weighted symbols being less than or equal to N and said weighted summation including a matrix of full rank; and receiving said N data streams in said second node, and converting said N data streams into each respective uncorrelated signal.

13. The method according to claim 12, further comprising the steps of transforming a correlated signal into said uncorrelated signal before transmission from each antenna element in each group of said first node, and retransforming each respective uncorrelated signal received at said second node into said correlated signal.

14. The method according to claim 12, further comprising the step of providing said second node with information of symbol weighting before said N data streams are converted.

15. The method according to claim 12, further comprising the steps of selecting said N antenna elements in each group to be equal to M uncorrelated symbols to be transferred (N=M), and selecting said antenna arrangement of said first node to have only one radio chain for each group of multiple antenna elements.

16. The method according to claim 12, further comprising the steps of storing said uncorrelated symbols in a memory arranged in said first node, and arranging said uncorrelated symbols into said M weighted symbols before transmitting.

17. The method according to claim 16, wherein said memory is a double circular buffer.

* * * * *

UNITED STATES PATENT AND TRADEMARK OFFICE
CERTIFICATE OF CORRECTION

PATENT NO. : 8,675,763 B2  
APPLICATION NO. : 13/123673  
DATED : March 18, 2014  
INVENTOR(S) : Lindgren et al.

Page 1 of 1

It is certified that error appears in the above-identified patent and that said Letters Patent is hereby corrected as shown below:

In the Specification

In Column 8, Line 43, delete "frequency G" and insert -- frequency $f_s$ --, therefor.

In Column 9, Line 55, delete "E[$x_k$(n)$x_1$(m)]=δ((k–1)+(n–m))" and insert -- $E[x_k(n)x_1(m)] = \delta((k - l) + \delta(n - m))$ --, therefor.

Signed and Sealed this  
Twenty-ninth Day of July, 2014

Michelle K. Lee  
*Deputy Director of the United States Patent and Trademark Office*